United States Patent [19]

Davies

[11] Patent Number: 5,201,254
[45] Date of Patent: Apr. 13, 1993

[54] WIRE STRIPPERS

[75] Inventor: Emrys I. Davies, Kingston, United Kingdom

[73] Assignee: British Aerospace Public Limited Company, London, England

[21] Appl. No.: 733,186

[22] Filed: Jul. 19, 1991

[30] Foreign Application Priority Data

Aug. 7, 1990 [GB] United Kingdom ............... 9017305

[51] Int. Cl.⁵ .............................................. H02G 1/12
[52] U.S. Cl. ........................................ 81/9.42; 30/124
[58] Field of Search .................. 81/9.4, 9.41, 9.42, 81/9.43; 30/124, 128, 131

[56] References Cited

U.S. PATENT DOCUMENTS

| | | | |
|---|---|---|---|
| 601,943 | 4/1898 | Burke | 30/131 |
| 1,862,556 | 6/1932 | Welhaven | 30/124 |
| 2,523,936 | 3/1948 | Axelsen | 81/9.5 |
| 2,711,584 | 6/1955 | Crider | 30/124 |
| 3,564,951 | 3/1971 | Metcalf | 81/9.5 |
| 4,027,557 | 2/1977 | Stepan | 81/9.5 R |
| 4,193,191 | 7/1980 | Sisco | 30/364 |

FOREIGN PATENT DOCUMENTS 2111376 11/1972 Fed. Rep. of Germany .
2505739 4/1976 Fed. Rep. of Germany .
2038108A 11/1979 United Kingdom .

OTHER PUBLICATIONS

British Search Report.
European Search Report.

Primary Examiner—Roscoe V. Parker
Attorney, Agent, or Firm—Nixon & Vanderhye

[57] ABSTRACT

An attachment for a pair of wire strippers for collecting pieces of stripped insulation 18. The attachment comprises a container 10 having a slot 12 for wire to pass through and a removable end cap 16. Stripped pieces of insulation 18 collect underneath a deflector plate 17 which prevents escape of said pieces out through the slot 12. The invention is of particular benefit in aircraft assembly areas where all foreign objects need to be collected and removed from aircraft structures.

20 Claims, 3 Drawing Sheets

Fig. 1. (PRIOR ART)
Fig. 2. (PRIOR ART)
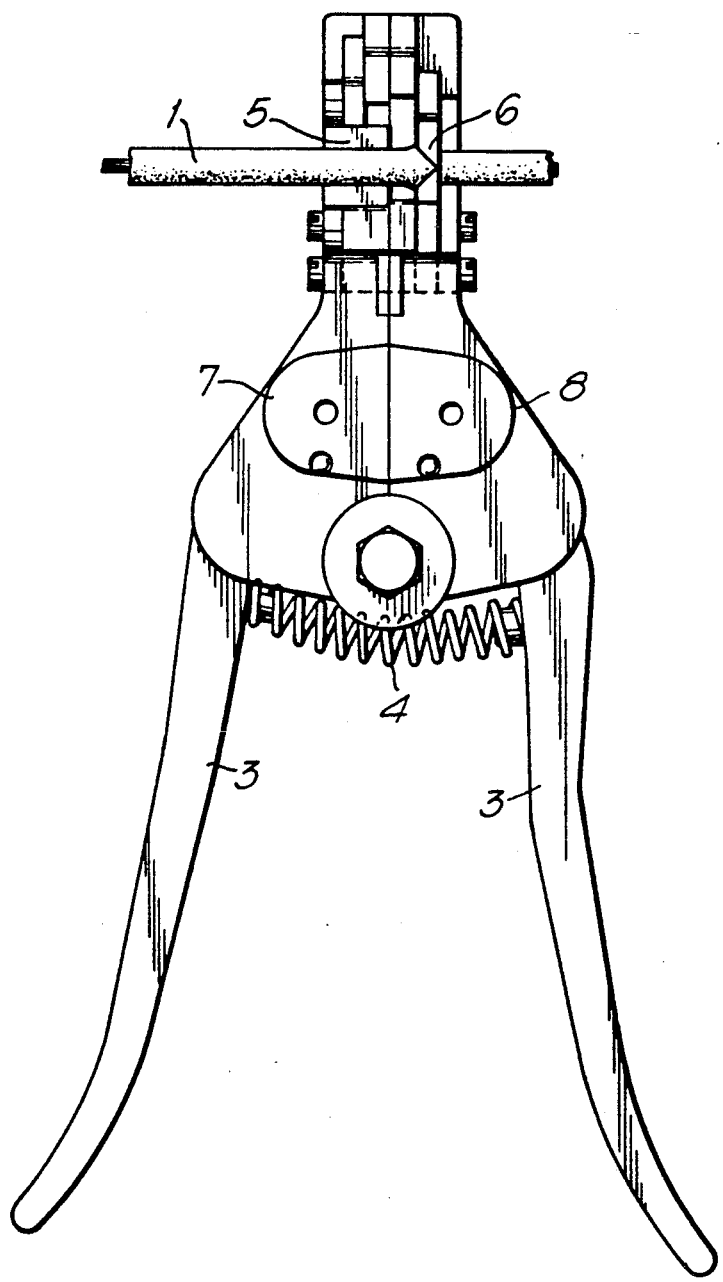
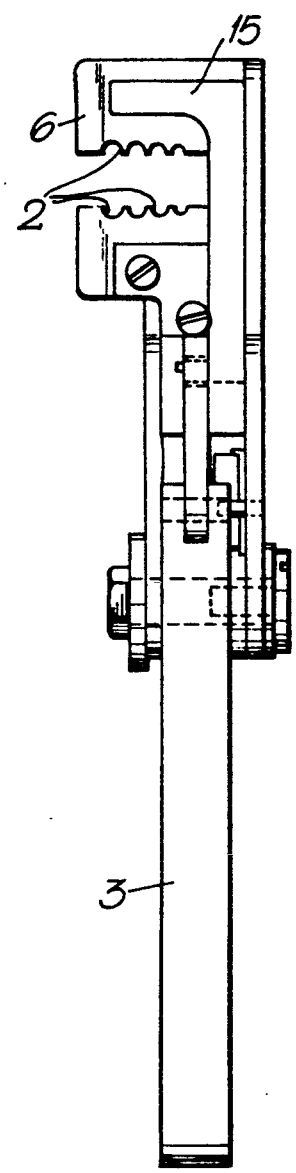

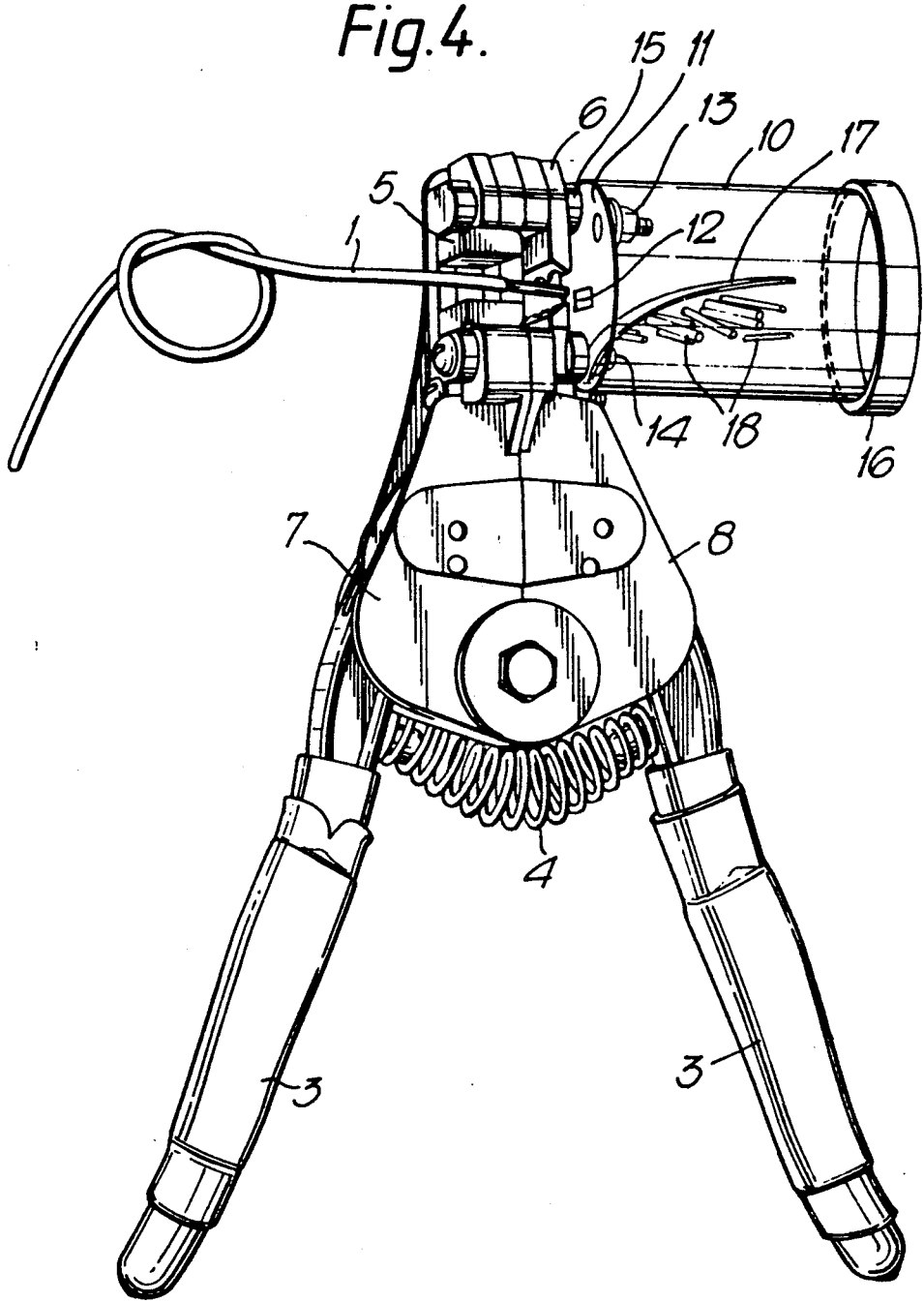

WIRE STRIPPERS

BACKGROUND OF THE INVENTION

This invention relates to improvements in wire strippers, such improvements being of particular benefit to the aircraft industry.

The improvement is particularly applicable to hand-held wire strippers of the type described in U.S. Pat. No. 2,523,936 and illustrated herein in FIGS. 1, 2, and 3.

In use, an insulated wire 1 is inserted into the jaw of the wire strippers and adjusted to lie within a suitably-sized notch 2. The handles 3 of the wire strippers are then squeezed together against the action of a spring 4. As the handles are drawn inwards, two members 5 and 6 move downwards to grip and cut, respectively, the insulation on the wire 1. As the handles are drawn further together, the shoulders 7 and 8 of the strippers move apart, carrying with them, respectively, the gripping member 5 and cutting member 6. (See FIG. 3). As the wire is still being gripped by the member 5 and the insulation has been cut, the unwanted piece of insulation 9 is pushed off the wire by the cutting member 6 and discarded. The grip on the handles 3 is then relaxed and the handles 3 are allowed to return to their original position under the action of the spring 4. During this final operation, the gripping and cutting members move upwards thus enabling the stripped wire to be removed from the wire strippers.

From the foregoing description, it will be apparent that the operator of the wire strippers has no means of controlling the flight of the severed insulation 9 as it is pushed away from the strippers. In current practice, the insulation is allowed to drop onto the floor of the operator's working area for later collection and disposal. This practice poses problems in the field of aircraft assembly.

During aircraft manufacture and assembly, large numbers of wiring looms require installation into the airframe assembly. These looms often comprise many cables which may need to be stripped in situ, inside an aircraft fuselage for example.

During aircraft assembly operations, it is essential that all foreign objects are removed from the airframe after each stage of assembly.

Foreign object damage (FOD) is a hazard well known to aircraft manufacturers and operators and stringent precautions must always be taken to reduce (and preferably, eliminate) the risk of FOD.

It will be appreciated that pieces of insulation left behind inside a fuselage after a wire-stripping operation, would constitute a FOD risk, jeopardising the safety of the aircraft and personnel.

Current practice, in this context is to visually locate and then remove all pieces of discarded insulation. Sometimes this operation is aided by inversion of the fuselage in question. Preferably, operators need to keep account of how many wires they have stripped.

It will be evident that this location and removal procedure is laborious. Another disadvantage is that it is not fail-safe.

This invention aims to obviate the need for said location and removal operation by providing a means for collection of the severed pieces of insulation. In particular, it provides such a means for collection which can be easily adapted for use with wire strippers of the type described above.

One known proposal for overcoming the afore-mentioned problems involves clamping the shoulders, 7 & 8 of the wire strippers so that their relative movement is severely limited. Using this method, the insulation, once cut remains on the wire. Also, the wire remains clamped by the member 5 until the operator relaxes his grip on the handles 3. He then removes the wire 1 from the strippers and pulls off the severed insulation. Although the operator can control removal of insulation, the procedure is time consuming. Furthermore, it is a two-handed operation.

The present invention provides a solution to the afore-mentioned problems which involves a quick, single-handed operation.

BRIEF SUMMARY OF THE INVENTION

Accordingly the invention consists of an attachment for wire strippers, said wire strippers being operable to strip insulation from a wire and having a jaw for gripping and cutting a wire and associated insulation and in which said attachment comprises a container attachable to the jaw so that stripped insulation is collected therein and means for preventing stripped insulation escaping from the container via said jaw.

Thus, all pieces of stripped insulator are collected, eliminating the risk of FOD during aircraft assembly.

The container may be of generally cylindrical form.

Preferably the container is made from a transparent material. In this case, the length of wire to be stripped and the number of pieces of insulation collected can be monitored by the operator.

The means for preventing escape of stripped insulation can comprise an end-plate located adjacent to the jaw when in use, and having a hole or a series of holes which line up with the notches 2 on the cutting member 6.

Alternatively, they can comprise an end plate having a slot through which a wire is inserted and a deflector plate, positioned inside the container.

Both of the above options will be described in greater detail below.

A further option is to mark the container with graduations to assist the operator in setting the length of wire to be stripped.

The container may be provided with a removable end cap which may comprise a threaded or bayonet-type fitting, so that when desired, the container can be emptied. It is particularly desirable when using the invention in aircraft assembly environments, to provide the end cap with a safety device so that inadvertent removal of the cap cannot occur.

Alternatively, the container could be arranged to be removably attached to the jaw of the wire strippers. Again a suitable arrangement could comprise a threaded or bayonet fitting.

BRIEF DESCRIPTION OF THE DRAWINGS

Some embodiments will now be described by way of example only with reference to the drawings of which:

FIG. 1, 2, and 3 show a known pair of wire strippers;

FIG. 4 is a perspective view of the wire strippers of FIGS. 1 to 3 incorporating an attachment in accordance with the present invention and;

Items common to all Figures are designated by the same reference numerals.

DETAILED DESCRIPTION OF THE PREFERRED EMBODIMENTS

Figure 3:
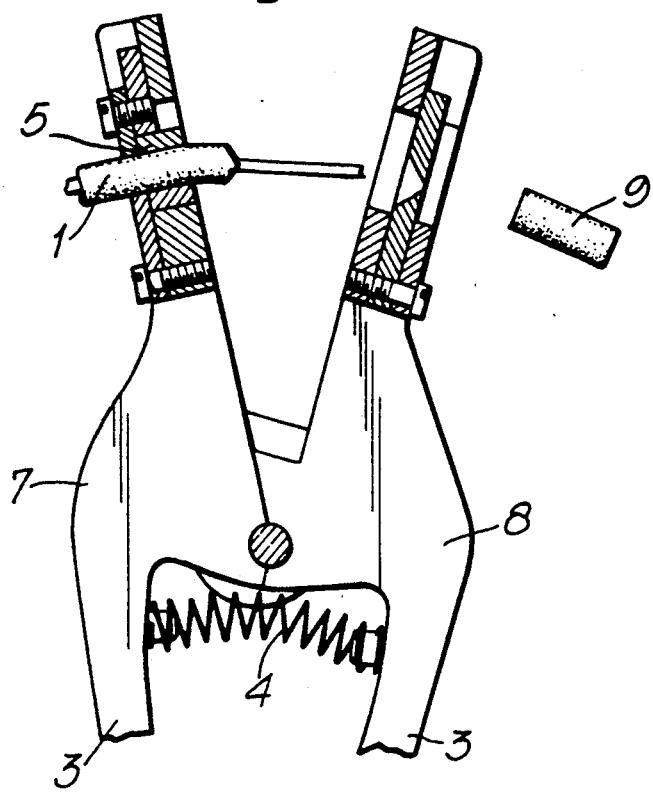

Referring to FIG. 4, an attachment in accordance with the invention comprises a cylindrical canister 10 made from a transparent plastics material. An end plate 11, integral with the canister is provided with a slot 12. The canister 10 is secured to the wire strippers by two screws 13, 14 fitted through the end plate 11 into two tapped holes in a jaw end plate 15 of the wire strippers.

The canister 10 is provided with a removable end cap 16. Inside the canister 10 is fixed a deflector plate 17 being secured at one of its ends to the end plate 11 by screw 14.

In use, the wire strippers are deployed as previously described with a wire 1 (or several wires) being inserted into the jaws and aligned with the appropriate notch 2. With the canister 10 in place that part of the wire 1 to be stripped will be inserted through the slot 12 and into the body of the canister. The handles are then squeezed together, the wire is cut by the member 6, and the severed insulation is pushed off the end of the stripped wire into the canister 10. The operator then rotates his wrist so that the stripped insulation rolls down the deflector plate 17 and underneath it. The presence of the deflector plate 17 thus prevents any pieces of severed insulation 18 from escaping out through the slot 12 and wire stripper jaws. When the canister 10 is full it can be emptied (away from the aircraft assembly area) by removing the end cap 16.

Figure 5:
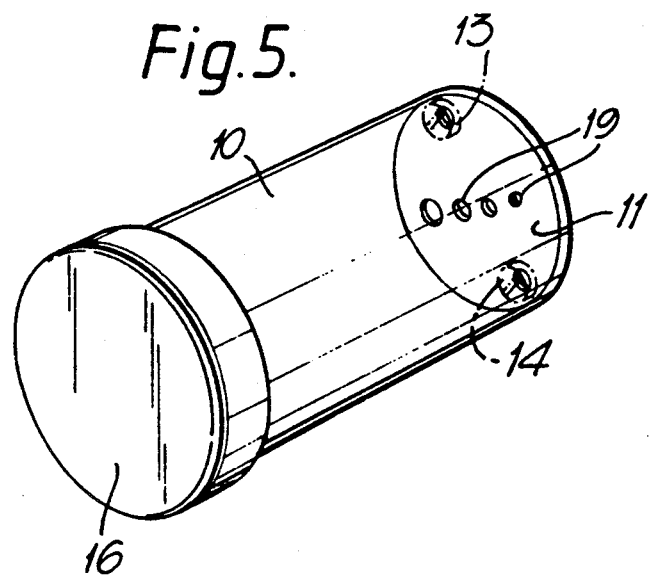
FIG. 5 is an perspective view of an alternative form of attachment.

In an alternative embodiment (See FIG. 5) the deflector plate 17 is removed and the slot 12 is replaced by a series of holes 19. The holes are positioned so that they are aligned with the notches 2.

In use, the wire to be stripped is inserted into an appropriate notch 2 and pushed through the corresponding hole 19. When the stripping procedure is complete, the severed insulation 18 is pushed through the hole 19 by the cutting member 6 and collected in the canister 10. It has been found that there is no risk of any piece of severed insulation 18 finding its way out of the canister 10 via any one of the holes 19. Thus, in this embodiment there is no need for a deflector plate 17.

While the invention has been described in conjunction with one particular form of wire strippers, it will be appreciated that it could be used on other types with similar success. The invention has the advantage that it is readily adaptable to the wire strippers, requiring minimal, if any, modification to the wire strippers themselves.

It will also be appreciated that, while the invention has been shown to be especially beneficial to the aircraft industry, it will be of use to operators in numerous other fields.

We claim:

1. An attachment for wire strippers, said wire strippers being operable to strip insulation from a wire and having a jaw for gripping and cutting associated insulation and in which said attachment comprises a container attachable to the jaw so that stripped insulation is collected therein and means for preventing stripped insulation from escaping from the container via said jaw in which the means for preventing escape of stripped insulation comprises an end-plate located adjacent to the jaw when in use and having a hole through which a wire can be inserted.

2. An attachment for wire strippers, said wire strippers being operable to strip insulation from a wire and having a jaw for gripping and cutting associated insulation and in which said attachment comprises a container attachable to the jaw so that stripped insulation is collected therein and means for preventing stripped insulation from escaping from the container via said jaw in which the means for preventing escape of stripped insulation comprises an end-plate having a slot through which a wire can be inserted and a deflector plate extending from the end plate across and within the container.

3. An attachment for wire strippers, said wire strippers being operable to strip insulation from a wire and having a jaw for gripping and cutting associated insulation, said attachment comprises:
   a container attachable to the jaw so that stripped insulation is collected therein; and
   means for preventing stripped insulation from escaping from the container via said jaw wherein said container is of cylindrical form.

4. An attachment for wire strippers, said wire strippers being operable to strip insulation from a wire and having a jaw for gripping and cutting associated insulation, said attachment comprises:
   a container attachable to the jaw so that stripped insulation is collected therein; and
   means for preventing stripped insulation from escaping from the container via said jaw wherein said container is made from a transparent material.

5. An attachment for wire strippers, said wire strippers being operable to strip insulation from a wire and having a jaw for gripping and cutting associated insulation and in which said attachment comprises a container attachable to the jaw so that stripped insulation is collected therein and means for preventing stripped insulation from escaping from the container via said jaw in which the container is marked with graduations for assisting an operator to set the length of wire to be stripped.

6. An attachment for wire strippers, said wire strippers being operable to strip insulation from a wire and having a jaw for gripping and cutting associated insulation, said attachment comprises:
   a container attachable to the jaw so that stripped insulation is collected therein; and
   means for preventing stripped insulation from escaping from the container via said jaw wherein said container is provided with a removable end cap.

7. A wire stripping device for stripping insulation from a wire without severing the wire, said device comprising:
   at least one pair of jaws for gripping said wire;
   at least one pair of jaws for stripping said insulation;
   collecting means for trapping and retaining insulation stripped from said wire, said collecting means including means for preventing stripped insulation from escaping from said collecting means via said stripping jaws; and
   means for locating said trapping and retaining means adjacent said insulation stripping jaws wherein said escape preventing means comprises an end plate located adjacent to said insulation stripping jaw having a hole through which said wire can be inserted prior to a tripping operation.

8. A wire stripping device for stripping insulation from a wire without severing the wire, said device comprising:
   at least one pair of jaws for gripping said wire;
   at least one pair of jaws for stripping said insulation;

collecting means for trapping and retaining insulation stripped from said wire, said collecting means including means for preventing stripped insulation from escaping from said collecting means via said stripping jaws; and means for locating said trapping and retaining means adjacent said insulation stripping jaws wherein said escape preventing means includes:

an end plate having a slot through which said wire can be inserted prior to a wire stripping operation, and a deflector plate extending from said end plate across and within said trapping and retaining means.

9. A wire stripping device for stripping insulation from a wire without severing the wire, said device comprising:

at least one pair of jaws for gripping said wire;
at least one pair of jaws for stripping said insulation;
collecting means for trapping and retaining insulation stripped from said wire, said collecting means including means for preventing stripped insulation from escaping from said collecting means via said stripping jaws; and
means for locating said trapping and retaining means adjacent said insulation stripping jaws, wherein said trapping and retaining means is of cylindrical form.

10. A wire stripping device for stripping insulation from a wire without severing the wire, said device comprising:

at least one pair of jaws for gripping said wire;
at least one pair of jaws for stripping said insulation;
collecting means for trapping and retaining insulation stripped from said wire, said collecting means including means for preventing stripped insulation from escaping from said collecting means via said stripping jaws; and
means for locating said trapping and retaining means adjacent said insulation stripping jaws, wherein said trapping and retaining means is comprised of a transparent material.

11. A wire stripping device for stripping insulation from a wire without severing the wire, said device comprising:

at least one pair of jaws for gripping said wire;
at least one pair of jaws for stripping said insulation;
collecting means for trapping and retaining insulation stripped from said wire, said collecting means including means for preventing stripped insulation from escaping from said collecting means via said stripping jaws; and
means for locating said trapping and retaining means adjacent said insulation stripping jaws, wherein said trapping and retaining means includes graduated marking thereon for assisting an operator to set the length of the wire to be stripped.

12. A wire stripping device for stripping insulation from a wire without severing the wire, said device comprising:

at least one pair of jaws for gripping said wire;
at least one pair of jaws for stripping said insulation;
collecting means for trapping and retaining insulation stripped from said wire, said collecting means including means for preventing stripped insulation from escaping from said collecting means via said stripping jaws; and
means for locating said trapping and retaining means adjacent said insulation stripping jaws, wherein said trapping and retaining means includes a removable end cap.

13. An attachment for wire strippers, said wire strippers being operable to strip insulation from a wire and having a jaw for gripping and cutting associated insulation, said attachment comprises:

a container attachable to the jaw so that stripped insulation is collected therein; and
means for preventing stripped insulation from escaping from the container via said jaw wherein the means for preventing escape of stripped insulation comprises a deflector plate extending across and within the container.

14. An attachment for wire strippers, said wire strippers being operable to strip insulation from a wire and having a jaw for gripping and cutting associated insulation, said attachment comprises:

a container attachable to the jaw so that stripped insulation is collected therein; and
means for preventing stripped insulation from escaping from the container via said jaw wherein the means for preventing escape of stripped insulation comprises a deflector plate supported within said container.

15. An attachment for wire strippers, said wire strippers being operable to strip insulation from a wire and having a jaw for gripping and cutting associated insulation, said attachment comprises:

a container attachable to the jaw so that stripped insulation is collected therein; and
means for preventing stripped insulation from escaping from the container via said jaw wherein the means for preventing escape of stripped insulation comprises deflector means supported within said container for obstructing the passage of collected insulation in said container to said aperture.

16. An attachment for wire strippers, said wire strippers being operable to strip insulation from a wire and having a jaw for gripping and cutting associated insulation, said attachment comprises:

a container attachable to the jaw so that stripped insulation is collected therein; and
means for preventing stripped insulation from escaping from the container via said jaw wherein the means for preventing escape of stripped insulation comprises:
an end-plate having a slot through which a wire can be inserted; and
deflector means supported within said container for obstructing the passage of collected insulation in said container to said slot.

17. A wire stripping device, said device comprising:
at least one pair of jaws for gripping said wire;
at least one pair of jaws for stripping said insulation;
collecting means for trapping and retaining insulation stripped from said wire, said collecting means including means for preventing stripped insulation from escaping from said collecting means via said stripping jaws; and
means for locating said trapping and retaining means adjacent said insulation stripping jaws wherein said escape preventing means includes a deflector plate extending across and within the means for trapping and retaining insulation.

18. A wire stripping device, said device comprising:
at least one pair of jaws for gripping said wire;
at least one pair of jaws for stripping said insulation;

collecting means for trapping and retaining insulation stripped from said wire, said collecting means including means for preventing stripped insulation from escaping from said collecting means via said stripping jaws; and means for locating said trapping and retaining means adjacent said insulation stripping jaws wherein said escape preventing means includes a deflector plate supported within the means for trapping and retaining insulation.

19. A wire stripping device, said device comprising:

at least one pair of jaws for gripping said wire;

at least one pair of jaws for stripping said insulation;

collecting means for trapping and retaining insulation stripped from said wire, said collecting means including means for preventing stripped insulation from escaping from said collecting means via said stripping jaws; and means for locating said trapping and retaining means adjacent said insulation stripping jaws wherein said collecting means has an aperture for allowing stripped insulation to pass therein; and said escape preventing means includes deflector means supported within the collecting means for obstructing the passage of collected insulation to said aperture.

20. A wire stripping device, said device comprising:

at least one pair of jaws for gripping said wire;

at least one pair of jaws for stripping said insulation;

collecting means for trapping and retaining insulation stripped from said wire, said collecting means including means for preventing stripped insulation from escaping from said collecting means via said stripping jaws; and means for locating said trapping and retaining means adjacent said insulation stripping jaws wherein the escape preventing means includes:

an end-plate having a slot through which said wire can be inserted prior to a wire stripping operation; and deflector means supported within said container for obstructing the passage of collected insulation to said slot.

* * * * *